May 20, 1958 H. A. SMITH, JR 2,835,165
EXPOSURE CONTROL FOR PHOTOGRAPHIC PRINTER
Filed Dec. 27, 1955
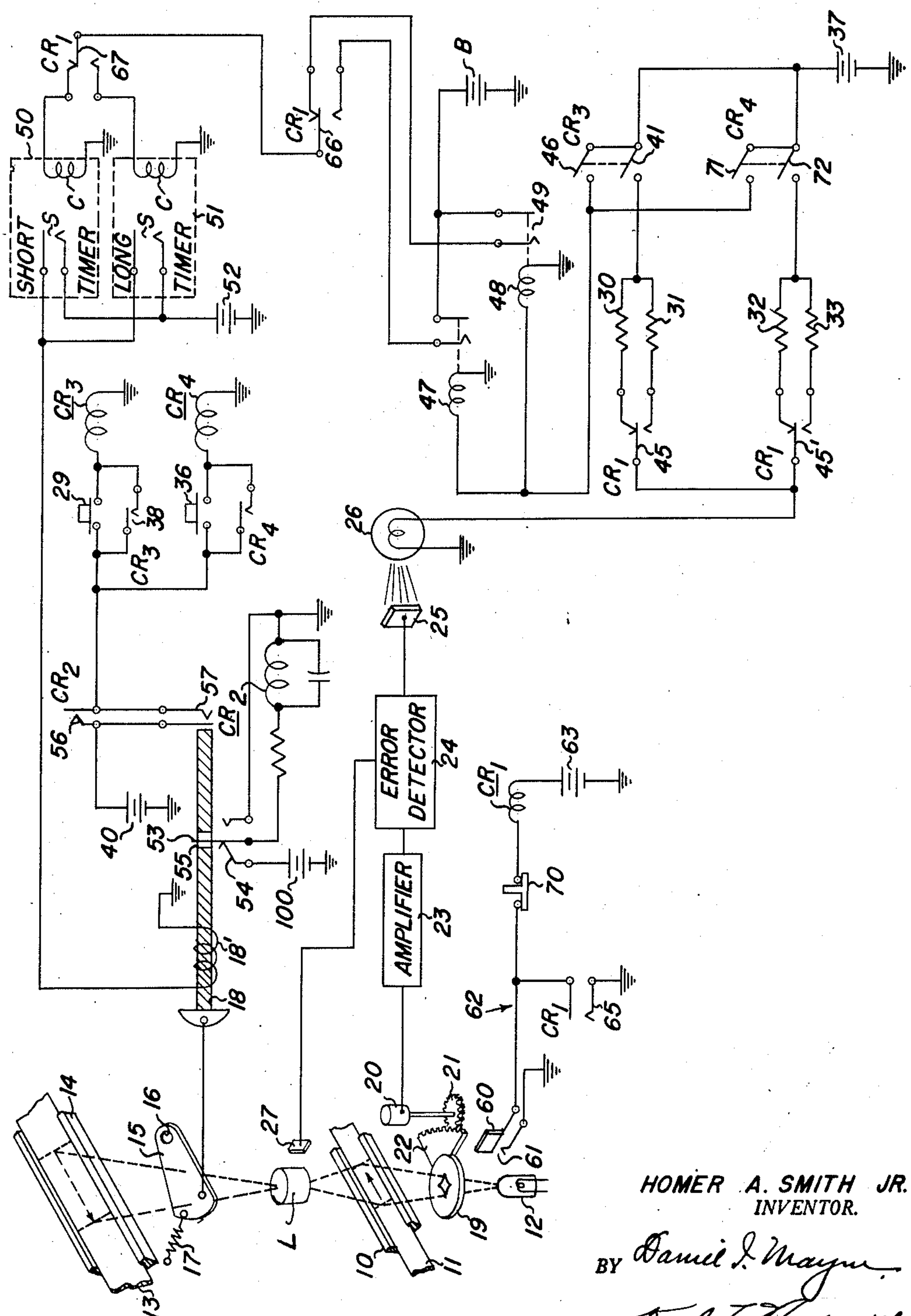

2,835,165
Patented May 20, 1958

2,835,165

EXPOSURE CONTROL FOR PHOTOGRAPHIC PRINTER

Homer A. Smith, Jr., Kodak Park, N. Y., assignor to Eastman Kodak Company, Rochester, N. Y., a corporation of New Jersey Application December 27, 1955, Serial No. 555,520

5 Claims. (Cl. 88—24)

The present invention relates to an automatic exposure control system for use on a photographic printer which is based on the variable intensity-constant time principle, and particularly to such a control system which is so designed that while it can accommodate photographic negatives having a wide range of densities, it operates in the fastest possible manner to keep the output of the printer at a maximum.

Photographic printers having automatic exposure control systems operating on the variable intensity-constant time principle are well known in the art, i. e., U. S. Patent 2,521,954, Tuttle et al., September 12, 1950. In such systems the intensity of the light source is adjusted by a self-balancing servo mechanism until the light transmitted by the negative equals a preselected value, as indicated by a monitoring photocell measuring the transmitted light and connected in closed loop relation with a standard reference potential, said last-mentioned light measuring system constituting a part of the servo mechanism. After the intensity of the printing beam has been adjusted to the preselected level, then a shutter is opened and held open by a timer to give a fixed time of exposure. Since there is a limit to the intensity of the light source which can be used with printers of this type because of the heat generated and source of power, among other reasons, such printers are restricted in the range of density of subject matter which they can satisfactorily print. This shortcoming could be overcome by adding one or more timers giving a longer exposure time, but this would defeat the automatic feature of the control system because the operator would have to judge the negative to know when to throw one of the longer timers into the control circuit. Another answer to this problem would be to use a timer having a long enough interval to accommodate even the most dense negative with the size of printing lamp used. However, this approach would unduly slow down the production rate of the printer, particularly when it is recognized that less than ten percent of the run-of-the-mill negatives would require a longer time of exposure than would be required with commercially used printing lamps and shorter exposure times.

One object of the present invention is to provide an automatic exposure control system for photographic printers which operates on the variable intensity-constant time principle but which overcomes the above-mentioned disadvantages of the known exposure control systems of this type.

Another object is to provide an automatic exposure control system for a photographic printer which produces a short or long time exposure depending on the density of the transparent record to be printed.

And a further object is to provide an automatic exposure control system of the type set forth which includes both a short timer and a long timer and a control circuit which normally connects the short timer in control relation but which automatically switches the long timer into control relation when the density of the transparent record is so great that it cannot be printed with the maximum light available from the printing source and using the time of exposure provided by the short timer.

The novel features that I consider characteristic of my invention are set forth with particularity in the appended claims. The invention itself, however, both as to its organization and its methods of operation, together with additional objects and advantages thereof, will best be understood from the following description of specific embodiments when read in connection with the accompanying drawings in which:

Fig. 1 is a diagrammatic representation of a photographic printer incorporating an automatic exposure control system constructed in accordance with a preferred embodiment of the present invention.

In general, because of the large range of density of subject matter to be printed and the desire to keep the exposure time short so as to maintain the maximum production, a timer circuit for a photographic printer has been developed which produces a short or long exposure depending upon the density of the original subject. An automatic exposure determining servo mechanism controls the light available from the lamphouse in response to commands from a reference photocell and a monitoring cell. If the light demanded by the reference cell is greater than the maximum light available from the printing lamp, the long timer is energized and a lower reference level is established which results in a greater total exposure (log E) than was possible at the short time. This scheme provide sufficient total range to print nearly all subject matter while at the same time using the available light efficiently on low density subjects.

Referring now to the drawings, a preferred embodiment of the present invention is illustrated in combination with a photographic printer of the projection type consisting of a negative carrier 10 defining a negative plane for supporting a transparent subject or negative 11 in a substantially flat condition in optical alignment with a light source 12 by which it is illuminated. The subject 11 may be a black-and-white or a colored negative or positive transparency as is well known in the art. The image of the subject 11 is projected in enlarged form by a projection lens L onto a suitable printing material 13 adapted to be held in a substantially flat condition in the printing plane in superposed relation with the subject 11 by a suitable transparent or apertured support 14. As is customary in high production printers of this type, means, not shown, may be provided for intermittently feeding the printing material in the form of a long web across the printing plane and means, not shown, may also be provided for intermittently feeding different subjects 11 into printing position in the negative plane. The exposure is controlled by an opaque shutter 15 pivoted at 16 to move between a normally closed position shown in the drawings where it cuts the printing beam off from the printing material and an open position wherein it is moved out of said printing beam and allows the projected light to fall on the printing material. The shutter is normally moved to a closed position by a spring 17 and is moved to an open position by the plunger 18 of a solenoid 18' when the latter is energized.

In order to vary the exposure, an iris diaphragm 19 is located between the light source and the subject matter 11. This iris is controlled by a reversible servomotor 20 which is connected to the adjustable member of the iris by a gear 21 and gear sector 22 so that when the motor drives in one direction, clockwise in this instance, the iris opens to pass more light and closes down when driven in a counterclockwise direction. The motor 20 is driven by an electronic amplifier 23 in response to a signal from an error detector 24 wherein two input voltages are connected in a closed loop relation. One of these input voltages is that generated by the reference or standard photocell 25 which is illuminated by a reference lamp 26. The other input voltage is one created by the monitor photocell 27 as the result of light transmitted by the subject material 11. The monitor photocell is physically located so that it is illuminated by the diffuse component of the light transmitted by the subject and can be left in position all of the time without obstructing the image of the subject matter projected onto the printing material.

If the voltage generated by the reference photocell 25 is greater than that from the monitor photocell (indicating more light at the reference cell than at the monitor cell), the error detector 24 produces a signal which, when amplified by amplifier 23, causes the iris motor 20 to turn in a direction to open the iris and permit more light to be transmitted to the monitor cell. The iris continues to open until the error detector receives equal inputs from the two photocells. With equal signals there is no error and the motor stops. The specific servo mechanism shown and described herein, including reversible motor 20, the amplifier 23 and the error detector 24, has not been shown in detail because such mechanisms are commmercially available in different forms and this particular use thereof is old, such being disclosed in U. S. Patent 2,521,954, Tuttle et al., September 12, 1950. As also shown in this patent, the present invention is not limited to the use of an adjustable iris 19 for adjusting the intensity of the printing light, but the same result can be obtained by having the motor of the servo mechanism adjust a rheostat in the power line to the light source. It is also possible to use a motor-driven density wedge for varying the intensity of the printing beam, as shown by U. S. Patent 2,464,162, Tuttle et al., March 8, 1949. Since this last-mentioned patent also completely discloses a particular type of adjustable iris diaphragm mechanism which might be used in the present printer, it is deemed unnecessary to do more than schematically show such a structure herein.

Coming now to the present invention, the output of the reference photocell 25 is determined by the brightness of the reference lamp 26 which in turn is adapted to be controlled by series resistors 30—33 which are selected by closing one or the other of manually operated classification switches 29 or 36. The selection of series resistors 30—33, and hence the operation of one or the other of classification switches 29 or 36, is based upon the exposure level desired after the operator has inspected the subject matter and determined by experience what classification switch should be closed. The illumination of the reference lamp 26 initiates an automatic printing cycle.

To start a printing cycle, either switch 29 or 36 is closed. As pointed out above, the choice of switch 29 or 36 is based on the amount of printing light desired and in actual practice there may be as many as five or more classification switches and associated control circuits although only two have been shown for purposes of simplicity. To simplify the explanation, what happens when only one switch 29 is closed will be described, although it will be appreciated that the same sequence of events takes place, but with different control circuits and components therein, when the other switch 36 is closed.

When manual switch 29 is momentarily closed, the coil of control relay $CR_3$ is energized from power supply 40 through a normally closed contact 56 on relay $CR_2$ and remains energized by means of one of its own contacts 38 which parallels switch 29. When relay $CR_3$ is energized, contact 41 on this relay is closed and power from source 37 is connected to a two-position control circuit including resistors 30 and 31 which will serve to limit the current available for reference lamp 26. Resistor 30 is of smaller value than resistor 31 so that when it is connected into the circuit of reference lamp 26, the lamp will be brighter than when resistor 31 is connected in the lamp circuit. Resistor 30 will normally be connected in circuit with the reference lamp 26 by contact 45 of transfer relay $CR_1$ so that when classification switch 29 is closed, lamp 26 will assume the brighter of two intensities possible at this classification. As the reference lamp brightens to a stable value, the reference photocell 25 generates a signal which is used to open the iris diaphragm 19 from a closed position.

Another contact 46 on relay $CR_3$ energizes two time delay relays 47 and 48 by connecting them to source 37. After a delay sufficient to permit the iris motor 20 to arrive at a balanced condition, one time delay relay 48 closes switch 49 which energizes a short shutter timer 50 by connecting it to source of power B. Two printing times and, hence, two printing timers are used in this control system. The short printing time may be approximately one (1) second and the long printing time may be approximately six (6) seconds. Accordingly, this system includes a short timer 50 and a long timer 51 which can be selectively connected into control relation with the shutter 15. The timers per se can be any one of many commercially available devices, i. e. one made by Timetrol Co., designated the Model #801, and since the individual structure of the timer is not important to the present invention, but only the function performed thereby, we have schematically designated each timer as a delay relay including a coil C which, when energized, closes a normally open control switch S. When the coil C is energized, the control switch S is closed and remains closed for a time characteristic of the timer after which the switch reopens regardless of whether the coil remains energized or not. When the short timer 50 is energized, the circuit to the solenoid 18' is completed to include source of power 52 and the shutter is opened for the time dictated by the short timer, after which the shutter solenoid is then de-energized and the shutter closes under the action of springs 17.

As the shutter opens, the movable contact 53 of a single-pole double-throw switch 54, which extends through an aperture 55 in the solenoid plunger 18, or is otherwise connected thereto, is moved to the position opposite that shown in the drawing wherein it shunts relay $CR_2$ which then releases and opens its contact 56 in the holding circuit of relay $CR_3$. However, a second switch 57 is operated by the solenoid plunger at this time to shunt contact 56 of relay $CR_2$ as long as the shutter remains open. Thus, relay $CR_3$ remains energized during the shutter cycle.

When the timed period expires and the switch S of the short timer opens, the shutter solenoid is de-energized and the shutter closes and movable contact 53 and switch 57 return to their normal positions shown in the drawings. The switch 54 energizes the coil circuit of relay $CR_2$ by connecting it to source of power 100, but since this relay is of the slow pick-up type, it does not become actuated immediately. On the other hand, switch 57 opens as soon as the shutter closes. During the time that switch 57 is opened and the contact 56 of relay $CR_2$ has not closed, the holding power for relay $CR_3$ is interrupted. As a result, relay $CR_3$ is de-actuated and remains in this condition until one of the classification switches 29 or 36 is again momentarily closed. The contacts 41 and 46 of relay $CR_3$ are opened as the relay releases so that power is removed from the reference lamp and time delay circuits.

However, if the subject matter or negative 11 is very dense, or so dense that a satisfactory print cannot be obtained by the use of the maximum light available from the printing lamp 12 and the use of the short exposure time, i. e. one second, a longer exposure must be given and the control system takes care of such a condition automatically by reducing the intensity of the printing light if necessary and increasing the time of exposure as will now be described. Assuming that a very dense negative 11 is moved into printing position, then there will be insufficient light transmitted to the monitor cell 27 to produce a signal equal to that from the reference photocell 25 as the result of light from reference lamp 26 illuminating the same. Consequently, the iris motor 20 will drive the iris 19 completely open. As the iris approaches a fully open position, the gear segment 22, or other part of the iris moving mechanism, engages a lug 60 and closes switch 61 in a transfer circuit 62 before the short time delay relay 48 has initiated a printing cycle.

Closure of switch 61 by the iris diaphragm completes the transfer circuit 62 from a power source 63 to the coil of control relay $CR_1$. One contact 65 of the relay $CR_1$ closes to shunt switch 61 and keeps the relay energized even if switch 61 reopens. A second contact 66 of relay $CR_1$ transfers the timer initiating circuit to a longer time delay circuit including relay 47 which provides additional time for the light balancing circuit to rebalance before initiating a shutter cycle.

A third contact 67 of relay $CR_1$ transfers the timer initiating circuit from the short timer 50 to the longer timer 51. The fourth contact 45 of $CR_1$ connects the larger resistor 31 into the circuit of the reference lamp 26 resulting in a lower reference lamp intensity. This lower reference voltage from the reference photocell 25 causes the iris motor 20 to close the iris until the light reaching the monitor photocell 27 is reduced to a value equal to the new reference level. The additional time provided by the long time delay relay 47 permits this to happen before the shutter opens. When the delay provided by relay 47 has expired, the initiating pulse goes to the long timer 51 through contact 67 of transfer relay $CR_1$. The shutter solenoid 18' is energized from source 52 in the same manner by either the short timer 50 or the long timer 51.

At the completion of the exposure, or when the shutter 15 closes, contact 41 on relay $CR_3$ is opened and the reference lamp 26 is extinguished resulting in the iris motor 20 closing the iris completely and removing the possibility of switch 61 still being actuated when the recycle switch 70 is momentarily opened to release transfer relay $CR_1$ and return the circuits to their original condition.

If classification switch 36 is depressed rather than classification switch 29, the circuit will function exactly in the same manner as described above except that now relay $CR_4$ will be energized instead of relay $CR_3$ and this will result in contacts 71 and 72 of relay $CR_4$ being closed instead of contacts 41 and 46 of relay $CR_3$. Closing of contact 72 will mean that the reference lamp 26 will be connected to the power source 37 through either resistor 32 or resistor 33, depending upon the position of contact 45' of transfer relay $CR_1$. As in the first instance, resistor 32 is of smaller value than resistor 33 and will give greater brightness to the reference lamp 26 than resistor 33. As before, resistor 32 will be connected in circuit at the same time the short timer 50 is and will be cut out in favor of resistor 33 by a transfer of contact 45' upon energization of relay $CR_1$ resulting from the iris opening to the position where switch 61 of the transfer circuit is closed by the iris driving mechanism reaching a nearly completely open position. At the time resistor 33 is connected into the reference lamp circuit the long timer 51 is also substituted for the short timer 50 by relay $CR_1$ as described before. Closing of contact 71 of relay $CR_4$ connects the two time delay relays 47 and 48 to power source 37 the same as did the closing of contact 46 of relay $CR_3$ as described above.

Several alternate possibilities for this control circuit are noted. The use of two printing levels selected by classification switches 29 and 36 can be extended to any number desired to accommodate different printing conditions. Also, the use of reference photocell 25 and reference lamp 26 as a standard can be replaced by varying potentials derived from a power source, such as battery 37.

It will be appreciated that this printer control circuit, while it accommodates subject matter having a wide range of densities, operates in such a manner as to keep the production of the printer at a maximum. Under normal conditions of operation, the control system makes use of the highest printing lamp intensity and the shortest exposure time and automatically shifts to a longer exposure time and lower printing lamp intensity only when negatives having a density so great that they cannot be satisfactorily printed by the short exposure are encountered. When it is remembered that not more than ten percent of the negatives encountered need the longer exposure time, it will be seen how this control system maintains a maximum printer output.

While I have shown and described certain specific embodiments of my invention, I am aware that many modifications thereof are possible. My invention, therefore, is not to be limited to the precise details of construction shown and described but is intended to cover all modifications coming within the scope of the appended claims.

Having thus described my invention, what I claim as new and desire to secure by Letters Patent of the United States is:

1. In a photographic printer the combination of means for supporting in superposed relation a transparent photographic record and a sensitized layer to be printed; means including a light source for directing light onto one side of said record and through the same and onto said layer; means for automatically varying the intensity of the light approaching said record until the intensity of the printing beam transmitted thereby reaches one or the other of two different preselected values; a shutter normally intercepting the printing beam transmitted by said record and cutting it off from said layer; means for opening said shutter and holding it open for one or the other of two different time intervals depending upon which of said preselected values the intensity of the printing beam is adjusted to; said last-mentioned means including a short timer and a long timer which are adapted to be selectively associated with said shutter opening means to hold the shutter open for a given time controlled thereby; and means including said intensity varying means and responsive to adjustment thereof for automatically connecting said short timer in control relation with said shutter opening means when the higher of said preselected values is used for balancing the intensity of said printing beam and for connecting said long timer in control relation with said shutter opening means when the lower of said preselected values is used for balancing the intensity of said printing beam.

2. A photographic printer according to claim 1 characterized by the fact that the means for automatically varying the intensity of the printing beam until it reaches one or the other of two different preselected intensities includes a separate reference means corresponding to each preselected value, means normally connecting the reference means corresponding to the higher preselected value and the short timer into control relation with the light intensity varying means and shutter opening means, respectively; and means including said intensity varying means and responsive to adjustment thereof for automatically switching the other reference means and the long timer into control relation instead of said first-mentioned reference means and short timer when the intensity varying means reaches a given point of adjustment.

3. In a photographic printer the combination of means for supporting in superposed relation a transparent photograhic record and a sensitized layer to be printed; means including a light source for directing light onto one side of said record and through the same and onto said layer; means for automatically varying the intensity of the light approaching said record until the intensity of the printing beam transmitted thereby reaches one or the other of two preselected values, said last-mentioned means including a reciprocal member for adjusting the intensity of said printing beam, a self-balancing servo system for driving said reciprocal member and comprising a monitor photocell for measuring the intensity of said printing beam, two separate reference potentials corresponding to opposite ones of said preselected values of intensity adapted to be selectively connected in an operative closed loop relation with the monitoring photocell to form an error detector, a reversible servo motor connected to said reciprocal member to drive the same and adapted to be energized for rotation in the appropriate direction by a signal coming from said error detector to reduce said signal to zero; a shutter normally intercepting the printing beam to cut it off from said layer; means for opening said shutter and holding it open for one or the other of two different time intervals depending upon which of said preselected values the intensity of the printing beam is to be adjusted to, and including a short timer and a long timer which are adapted to be selectively connected in control relation with said shutter opening means to hold the shutter open for a given time controlled thereby, a two-position control circuit adapted in a first position to connect the short timer and the reference potential corresponding to the higher preselected value of intensity into operative relation with the shutter operating means and error detector, respectively, and in its second position adapted to connect the long timer and other reference potential in operative relation with said shutter operating means and error detector, respectively, instead of the short timer and first reference potential, means for biasing said control circuit to its first position; a transfer circuit adapted when closed to transfer said two-position control circuit from its first to its second position and including means for holding itself closed when it is once momentarily closed; a normally open switch in said transfer circuit adapted to be closed by a part of said intensity adjusting means when a position is reached corresponding to substantially the maximum intensity the light source is capable of; and means for momentarily opening the transfer circuit to release the hold-in for resetting the control circuits to their normal conditions.

4. A photographic printer according to claim 3 characterized by the fact that the two reference potentials corresponding to different ones of the two preselected values of intensity comprise a reference photocell connected in opposing relation to said monitor photocell, a lamp for illuminating said reference cell and two different resistances adapted to be selectively connected in the energizing circuit of said lamp.

5. In a photographic printer the combination of means for supporting in superposed relation a transparent photographic record and a sensitized layer to be printed; means including a light source for directing light onto one side of said record and through the same and onto said layer; means for automatically varying the intensity of the light approaching said record until the intensity of the printing beam transmitted thereby reaches one or the other of two different preselected values and including an adjustable member adapted to be driven in opposite directions to increase or decrease the intensity of the printing beam; a reversible servo motor for driving said adjustable member; a shutter normally intercepting the printing beam transmitted by said record and cutting it off from said layer; means for opening said shutter and holding it open for one or the other of two different time intervals depending upon which of said preselected values the intensity of the printing beam is adjusted to; said last-mentioned means including a short timer and a long timer which are adapted to be selectively associated with said shutter opening means to hold the shutter open for a given time controlled thereby; means normally connecting said short timer in control relation with said shutter opening means; and means operated by said adjustable member when it reaches a position of adjustment corresponding to a maximum adjustment of intensity of said printing beam for cutting said long timer into control relation with said shutter opening means in place of said short timer.

References Cited in the file of this patent

UNITED STATES PATENTS 2,463,985 Linde ---------------- Mar. 8, 1949